(12) United States Patent
Hayashida et al.

(10) Patent No.: US 9,666,378 B2
(45) Date of Patent: May 30, 2017

(54) POWER STORAGE MODULE

(71) Applicants: HONDA MOTOR CO., LTD., Tokyo (JP); GS YUASA INTERNATIONAL LTD., Kyoto-shi, Kyoto (JP)

(72) Inventors: Atsushi Hayashida, Wako (JP); Tsubasa Ikeya, Wako (JP); Masao Kawata, Tokyo (JP); Makoto Ishiguro, Kyoto (JP)

(73) Assignees: HONDA MOTOR CO., LTD., Tokyo (JP); GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 14/402,466

(22) PCT Filed: Apr. 18, 2013

(86) PCT No.: PCT/JP2013/061469
§ 371 (c)(1),
(2) Date: Nov. 20, 2014

(87) PCT Pub. No.: WO2013/179798
PCT Pub. Date: Dec. 5, 2013

(65) Prior Publication Data
US 2015/0147613 A1 May 28, 2015

(30) Foreign Application Priority Data
May 31, 2012 (JP) .................................. 2012-124861

(51) Int. Cl.
*H01M 2/20* (2006.01)
*H01G 11/04* (2013.01)
(Continued)

(52) U.S. Cl.
CPC .............. *H01G 11/04* (2013.01); *H01G 2/04* (2013.01); *H01G 2/08* (2013.01); *H01G 2/14* (2013.01);
(Continued)

(58) Field of Classification Search
None
See application file for complete search history.

(56) References Cited

U.S. PATENT DOCUMENTS

2009/0053591 A1* 2/2009 Ikeda ...................... H01M 2/24
429/159
2012/0028094 A1* 2/2012 Kim .................... H01M 2/0242
429/99

(Continued)

FOREIGN PATENT DOCUMENTS

| JP | 2006-260905 A | 9/2006 |
| JP | 2008-166191 A | 7/2008 |

(Continued)

OTHER PUBLICATIONS

International Search Report dated Jun. 4, 2013 corresponding to International Patent Application No. PCT/JP2013/061469 and English translation thereof.

*Primary Examiner* — Patrick Ryan
*Assistant Examiner* — Haixia Zhang
(74) *Attorney, Agent, or Firm* — Squire Patton Boggs (US) LLP (57) ABSTRACT

A plurality of power storage cells and a plurality of power storage cell holders are stacked alternately in the stacking direction. End plates are superimposed at opposite ends of the power storage cells and power storage cell holders. The end plates are connected by a frame, the frame is covered by an insulator, and the plurality of power storage cells are electrically connected by a bus bar plate, forming a power storage module. Since the surface of the power storage cell (Continued)

is formed from a covered portion covered by the condensation-preventing sheet and a non-covered portion not covered by the condensation-preventing sheet, and the non-covered portion is covered by the power storage cell holder, the insulator, and the bus bar plate, the non-covered portion is covered as much as possible to provide heat insulation, minimizing occurrence of condensed water and preventing formation of a liquid junction.

4 Claims, 11 Drawing Sheets (51) Int. Cl.
| H01M 2/10 | (2006.01) |
| H01M 10/48 | (2006.01) |
| H01G 11/10 | (2013.01) |
| H01G 11/18 | (2013.01) |
| H01G 2/04 | (2006.01) |
| H01G 2/08 | (2006.01) |
| H01G 2/14 | (2006.01) |

(52) U.S. Cl.
CPC ............ *H01G 11/10* (2013.01); *H01G 11/18* (2013.01); *H01M 2/1072* (2013.01); *H01M 2/206* (2013.01); *H01M 10/486* (2013.01); *H01M 2200/10* (2013.01); *H01M 2220/20* (2013.01); *Y02E 60/13* (2013.01); *Y02T 10/7022* (2013.01)

(56) References Cited

U.S. PATENT DOCUMENTS

| 2012/0064386 A1* | 3/2012 | Oguri | H01M 2/1016 429/156 |
| 2012/0231324 A1* | 9/2012 | Brisbane | H01M 2/043 429/152 |

FOREIGN PATENT DOCUMENTS

| JP | 2008-277050 A | 11/2008 |
| JP | 2009-205820 A | 9/2009 |
| JP | 2010-153141 A | 7/2010 |
| JP | 2010-170870 A | 8/2010 |
| JP | 2010-287408 A | 12/2010 |
| WO | WO 2012/053581 A1 | 4/2012 |

* cited by examiner

POWER STORAGE MODULE

TECHNICAL FIELD

The present invention relates to a power storage module that includes a plurality of power storage cells and a plurality of power storage cell holders that are stacked alternately in a stacking direction, a pair of end plates that are superimposed at opposite ends in the stacking direction of the power storage cells and the power storage cell holders, a frame that connects the pair of end plates, an insulating insulator that covers the frame, and an insulating bus bar plate that has a metal plate electrically connecting the plurality of power storage cells to each other.

BACKGROUND ART

If condensed water occurs on the surface of a power storage cell forming such a power storage module, there is a possibility that a liquid junction will be formed between the power storage cell and a vehicle body frame, etc. via the condensed water; an arrangement in which a cooled surface of the power storage cell, on which condensed water particularly easily occurs, is covered by a condensation-preventing sheet so as to carry out heat insulation is known from Patent Document 1 below.

RELATED ART DOCUMENTS

Patent Documents

Patent Document 1: Japanese Patent Application Laid-open No. 2010-153141

SUMMARY OF THE INVENTION

Problems to be Solved by the Invention

Since the whole of a case of a power storage cell is formed from metal, there is a possibility that condensed water will occur on not just a cooled surface but on the whole surface. However, since a concave-convex part of an electrode, etc. is present on the surface of a power storage cell, it is difficult in terms of cost to cover the whole surface with a condensation-preventing sheet. When only part of the surface of the power storage cell is covered with a condensation-preventing sheet, it becomes necessary to prevent as much as possible a part that is not covered by the condensation-preventing sheet from contacting air, thus minimizing the occurrence of condensed water.

The present invention has been accomplished in light of the above circumstances, and it is an object thereof to minimize the occurrence of condensed water on the surface of a power storage cell.

Means for Solving the Problems

In order to attain the above object, according to a first aspect of the present invention, there is provided a power storage module comprising a plurality of power storage cells and a plurality of power storage cell holders that are stacked alternately in a stacking direction, a pair of end plates that are superimposed at opposite ends in the stacking direction of the power storage cells and the power storage cell holders, a frame that connects the pair of end plates, an insulating insulator that covers the frame, and an insulating bus bar plate that has a metal plate electrically connecting the plurality of power storage cells to each other, wherein a surface of the power storage cell comprises a covered portion that is covered by a condensation-preventing sheet and a non-covered portion that is not covered by the condensation-preventing sheet, and the non-covered portion is covered by the power storage cell holder, the insulator, and the bus bar plate.

Further, according to a second aspect of the present invention, in addition to the first aspect, the plurality of power storage cell holders comprise a thermistor retaining portion that retains a thermistor for measuring a temperature of the power storage cell, the thermistor retaining portion is disposed at a position of the power storage cell holder where the power storage cell holder covers the non-covered portion of the power storage cell, the number of thermistors is smaller than the number of power storage cell holders, and an opening is formed in those of the thermistor retaining portions into which the thermistor is not fitted, the opening communicating with the non-covered portion.

Furthermore, according to a third aspect of the present invention, in addition to the second aspect, the insulator comprises a first partition wall extending along the stacking direction between the opening and the frame.

Moreover, according to a fourth aspect of the present invention, in addition to the third aspect, among the plurality of power storage cell holders the pair of power storage cell holders that are adjacent to the pair of end plates comprise a second partition wall surrounding the opening in cooperation with the first partition wall.

A main face 11a and a side face 11b of an embodiment correspond to the covered portion of the present invention, a top face 11c and a bottom face 11d of the embodiment correspond to the non-covered portion of the present invention, an intermediate power storage cell holder 12 and end power storage cell holders 12A and 12B of the embodiment correspond to the power storage cell holder of the present invention, an upper frame 15 and a lower frame 16 of the embodiment correspond to the frame of the present invention, and an upper insulator 18 and a lower insulator 19 of the embodiment correspond to the insulator of the present invention.

Effects of the Invention

In accordance with the first aspect of the present invention, the plurality of power storage cells and the plurality of power storage cell holders are stacked alternately in the stacking direction, the pair of end plates are superimposed at opposite ends in the stacking direction of the power storage cells and power storage cell holders, the pair of end plates are connected by the frame, the frame is covered by the insulating insulator, and the plurality of power storage cells are electrically connected to each other by the metal plate of the insulating bus bar plate, thus forming the power storage module. Since the surface of the power storage cell is formed from a covered portion where the surface is covered by the condensation-preventing sheet and a non-covered portion where it is not covered by the condensation-preventing sheet, and the non-covered portion is covered by the power storage cell holder, the insulator, and the bus bar plate, it is possible to cover the non-covered portion, on which condensed water easily occurs, as much as possible to thus carry out heat insulation, thereby minimizing the occurrence of condensed water and preventing the formation of a liquid junction.

Furthermore, in accordance with the second aspect of the present invention, the plurality of power storage cell holders include the thermistor retaining portion, and the temperature of the power storage cell is measured by the thermistor retained by the thermistor retaining portion of some of the power storage cell holders. Since the thermistor retaining portion of the power storage cell holder is disposed at a position where it covers the non-covered portion of the power storage cell, and an opening communicating with the non-covered portion of the power storage cell is formed in the thermistor retaining portion, condensed water occurring on the non-covered portion of the power storage cell can be discharged to the outside via the opening, thus preventing condensed water from forming a liquid junction between the power storage cells.

Moreover, in accordance with the third aspect of the present invention, since the insulator includes the first partition wall extending along the stacking direction between the opening and the frame, it is possible to reliably prevent by means of the first partition wall the condensed water flowing out via the opening from forming a liquid junction on the frame.

Furthermore, in accordance with the fourth aspect of the present invention, since, among the plurality of power storage cell holders, the pair of power storage cell holders that are adjacent to the pair of end plates include the second partition wall surrounding the opening in cooperation with the first partition wall, it is possible to reliably prevent by means of the second partition wall the condensed water flowing out via the opening from forming a liquid junction on the end plate.

EXPLANATION OF REFERENCE NUMERALS AND SYMBOLS

11 Power storage cell
11a Main face (covered portion)
11b Side face (covered portion)
11c Top face (non-covered portion)
11d Bottom face (non-covered portion)
12 Intermediate power storage cell holder (power storage cell holder)
12A End power storage cell holder (power storage cell holder)
12B End power storage cell holder (power storage cell holder)
12c Thermistor retaining portion
12j Second partition wall
14 End plate
15 Upper frame (frame)
16 Lower frame (frame)
18 Upper insulator (insulator)
19 Lower insulator (insulator)
19d First partition wall
21A Thermistor
21B Thermistor
28 Bus bar plate
α Opening Modes for Carrying out the Invention A mode for carrying out the present invention is explained below by reference to FIG. 1 to FIG. 11.

First Embodiment

Figure 1:
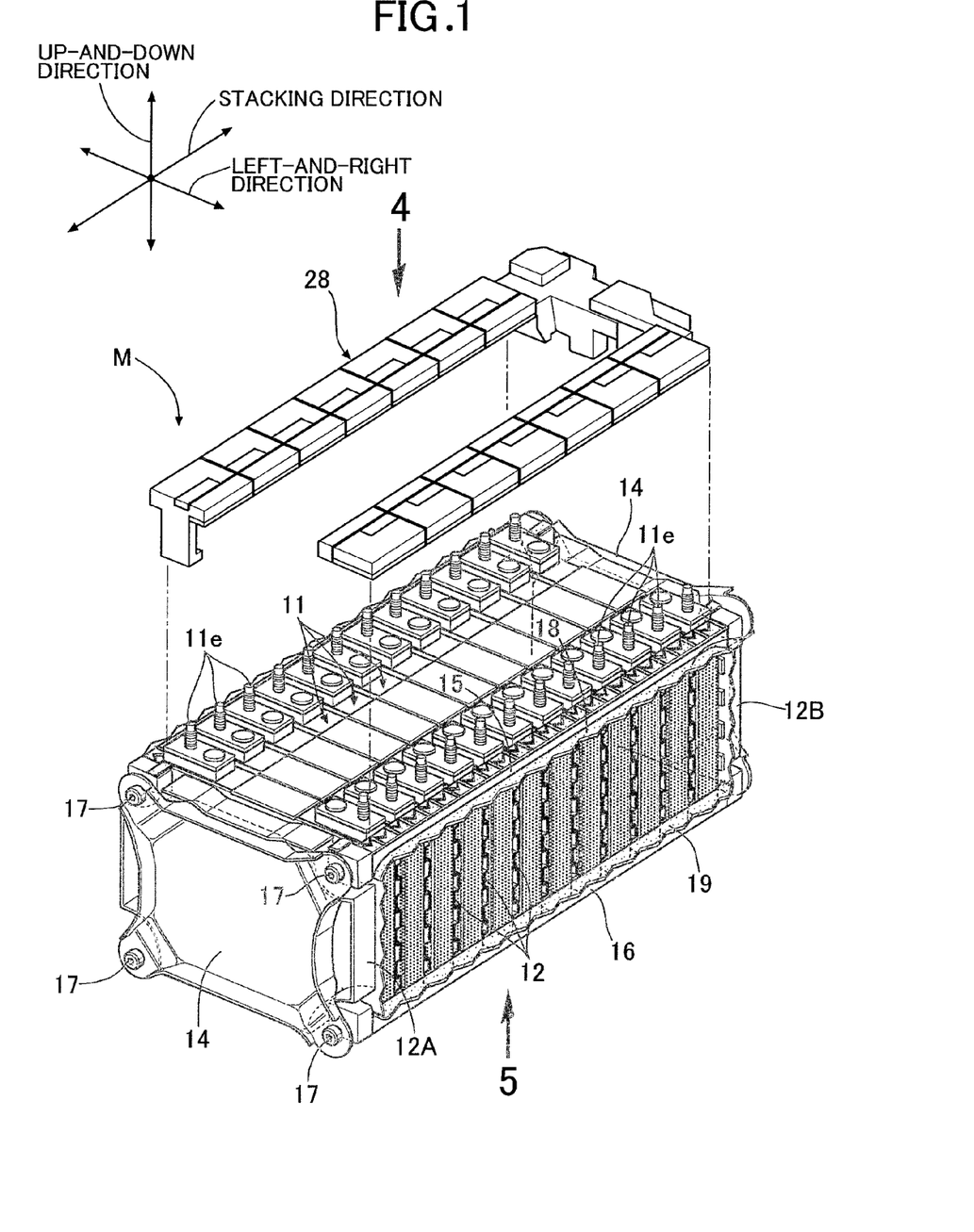
FIG. 1 is a perspective view of a power storage module. (first embodiment)
Figure 2:
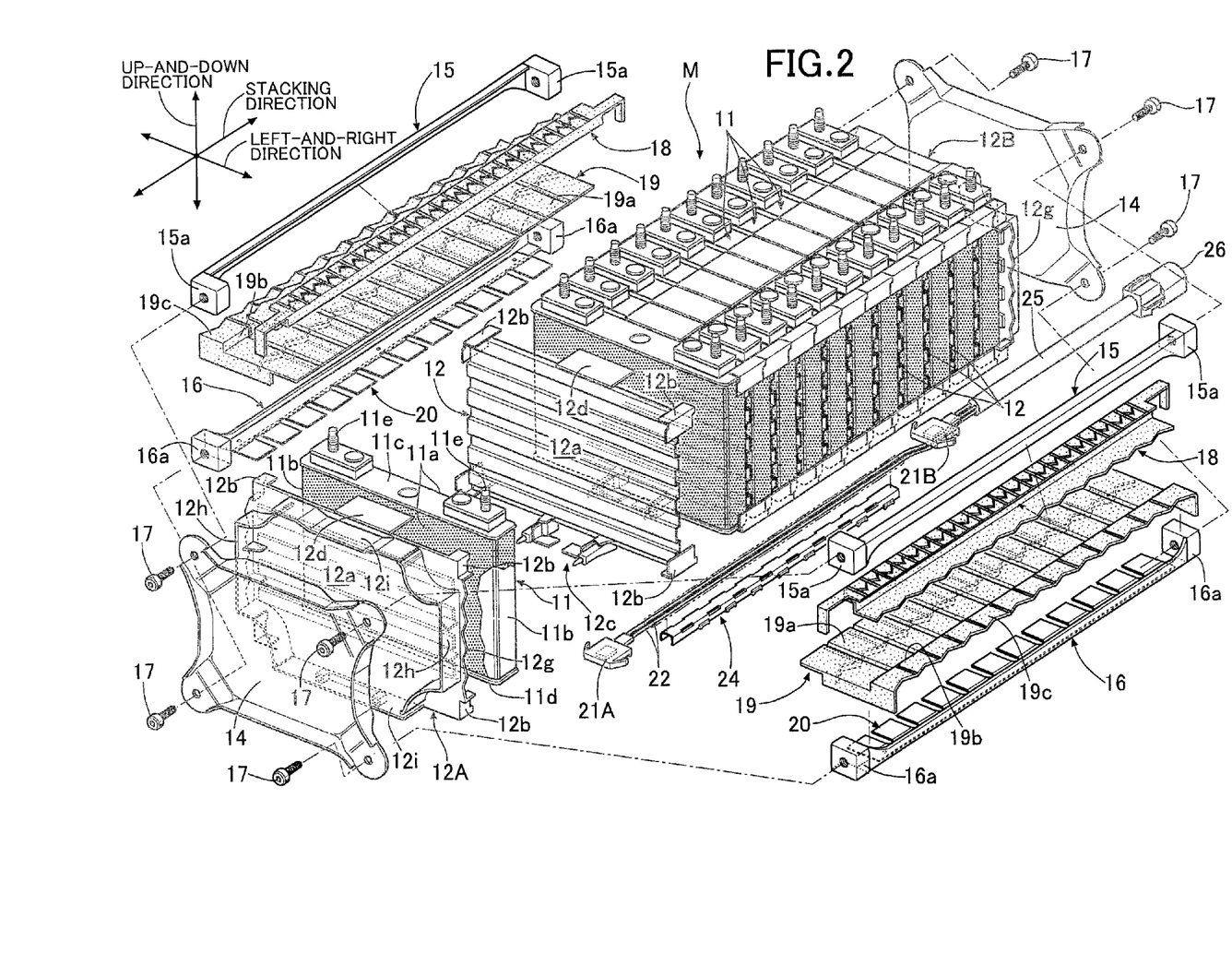
FIG. 2 is an exploded perspective view of the power storage module. (first embodiment)

As shown in FIG. 1 and FIG. 2, a power storage module M, which is used as a power supply device for an electric automobile or a hybrid automobile, includes a predetermined number (12 in the embodiment) of power storage cells 11 that are stacked in a stacking direction. Each power storage cell 11 formed from for example a lithium ion battery is formed into a rectangular parallelepiped and includes a pair of mutually opposing main faces 11a and 11a, a pair of mutually opposing side faces 11b and 11b perpendicular to the main faces 11a and 11a, and mutually opposing top face 11c and bottom face 11d perpendicular to the main faces 11a and 11a and the side faces 11b and 11b, positive and negative electrodes 11e and 11e being provided on the top face 11c.

The pair of main faces 11a and 11a and the pair of side faces 11b and 11b of each power storage cell 11 are covered by a condensation-preventing sheet made of a synthetic resin, thus making it difficult for condensed water to be formed on the surface of the power storage cell 11, which is made of metal. However, the top face 11e and the bottom face 11d of each power storage cell 11 are not covered by a condensation-preventing sheet, and the metal surface is exposed.

In the present specification, a direction that is perpendicular to the stacking direction and joins the top face 11c and the bottom face 11d of the power storage cell 11 is defined as the up-and-down direction, and a direction that is perpendicular to the stacking direction and joins the pair of side faces 11b and 11b of the power storage cell 11 is defined as the left-and-right direction.

The main faces 11a of twelve of the power storage cells 11 and eleven rectangular plate-shaped intermediate power storage cell holders 12, made of a synthetic resin, are superimposed in turn in the stacking direction, a pair of rectangular plate-shaped end power storage cell holders 12A and 12B, made of a synthetic resin, are superimposed on outer sides, in the stacking direction, of the two power storage cells 11 and 11 at opposite ends in the stacking direction, and a pair of end plates 14 and 14, made of metal, are further superimposed on outer sides thereof in the stacking direction. The eleven intermediate power storage cell holders 12 are members having an interchangeable identical shape, and the pair of end power storage cell holders 12A and 12B are members having shapes that are different from that of the intermediate power storage cell holders 12 and having mutually different shapes.

In a state in which the power storage cells 11, the intermediate power storage cell holders 12, the end power storage cell holders 12A and 12B, and the end plates 14 and 14 are stacked in the stacking direction, four corners of the pair of end plates 14 and 14 are linked to each other by means of upper frames 15 and 15 formed from a pair of rod-shaped members made of metal and having an L-shaped cross section, and lower frames 16 and 16 formed from a pair of rod-shaped members made of metal and having an L-shaped cross section, thus carrying out assembly of the power storage module M. That is, the power storage module M is assembled by abutting thick fastening portions 15a provided at opposite ends of the upper frames 15 and 15 and thick fastening portions 16a provided at opposite ends of the lower frames 16 and 16 against the four corners of the end plates 14 and 14, and screwing bolts 17 extending through the end plates 14 and 14 into the fastening portions 15a, 16a.

In this arrangement, in order to prevent condensed water from forming a liquid junction between the power storage cells 11 and the upper frames 15 and 15, upper insulators 18 and 18, made of a synthetic resin, are disposed between the upper frames 15 and 15 and the power storage cells 11, intermediate power storage cell holders 12, and end power storage cell holders 12A and 12B. Similarly, in order to prevent condensed water from forming a liquid junction between the power storage cells 11 and the lower frames 16, lower insulators 19 and 19, made of a synthetic resin, are disposed between the lower frames 16 and 16 and the power storage cells 11, intermediate power storage cell holders 12, and end power storage cell holders 12A and 12B. Furthermore, plate springs 20 and 20 for preventing the occurrence of rattling by pushing the bottom faces 11d of the power storage cells 11 upward are disposed between the lower frames 16 and 16 and the lower insulators 19 and 19.

Each of the intermediate power storage cell holders 12 and the end power storage cell holders 12A and 12B includes a plate-shaped plate portion 12a, four engagement portions 12b projecting in the stacking direction from four corners of the plate portion 12a, a thermistor retaining portion 12c provided in a middle part at the lower end of the plate portion 12a, and a plate-shaped shielding portion 12d projecting in the stacking direction from a middle part in the left-and-right direction of the upper edge of the plate portion 12a. However, the end power storage cell holder 12A alone on one end side in the stacking direction does not include the thermistor retaining portion 12c, and the end power storage cell holder 12B alone on the other end side in the stacking direction does not include the shielding portion 12d.

Figure 10:
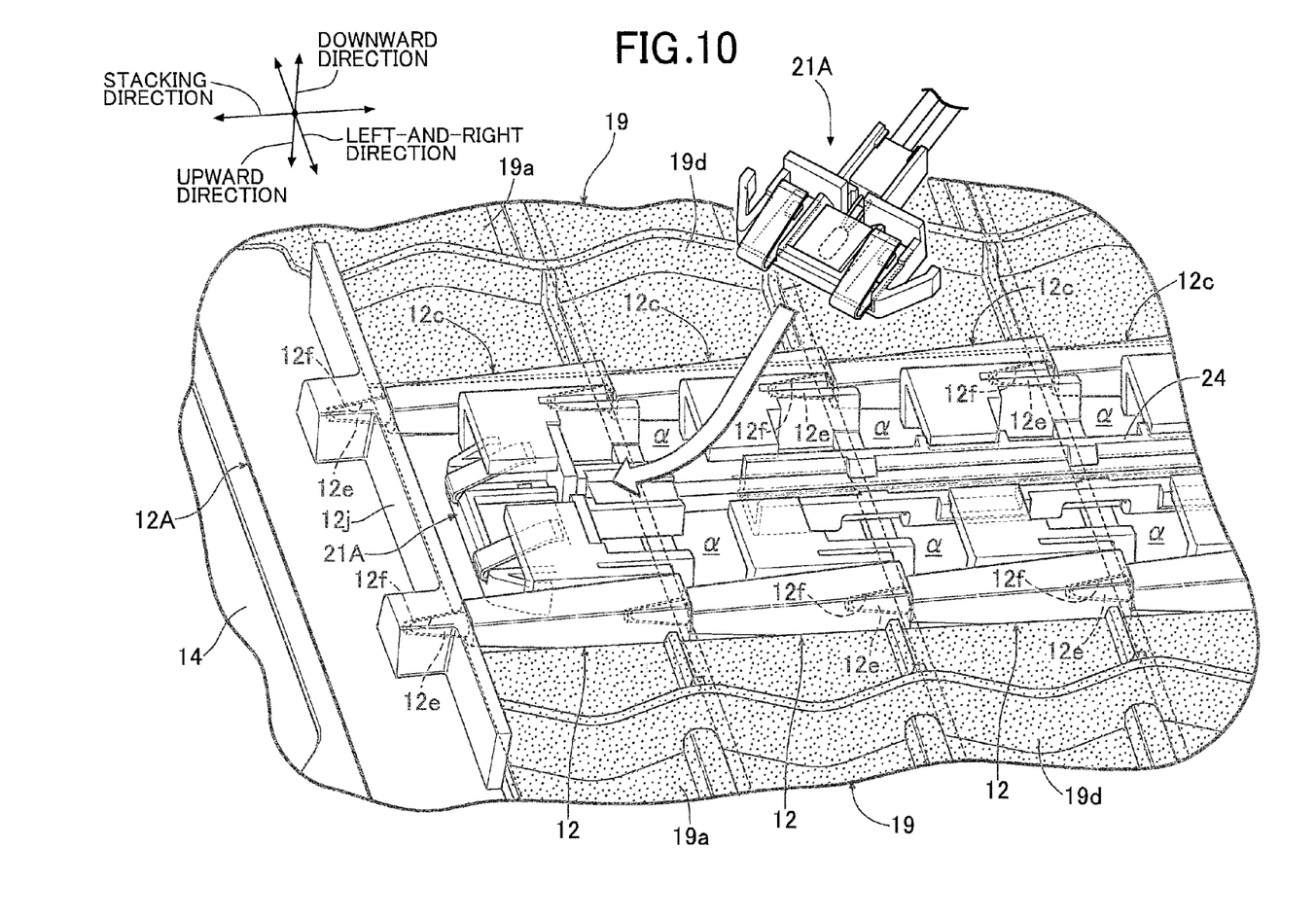
FIG. 10 is a view in the direction of arrow 10 in FIG. 5. (first embodiment)
Figure 11:
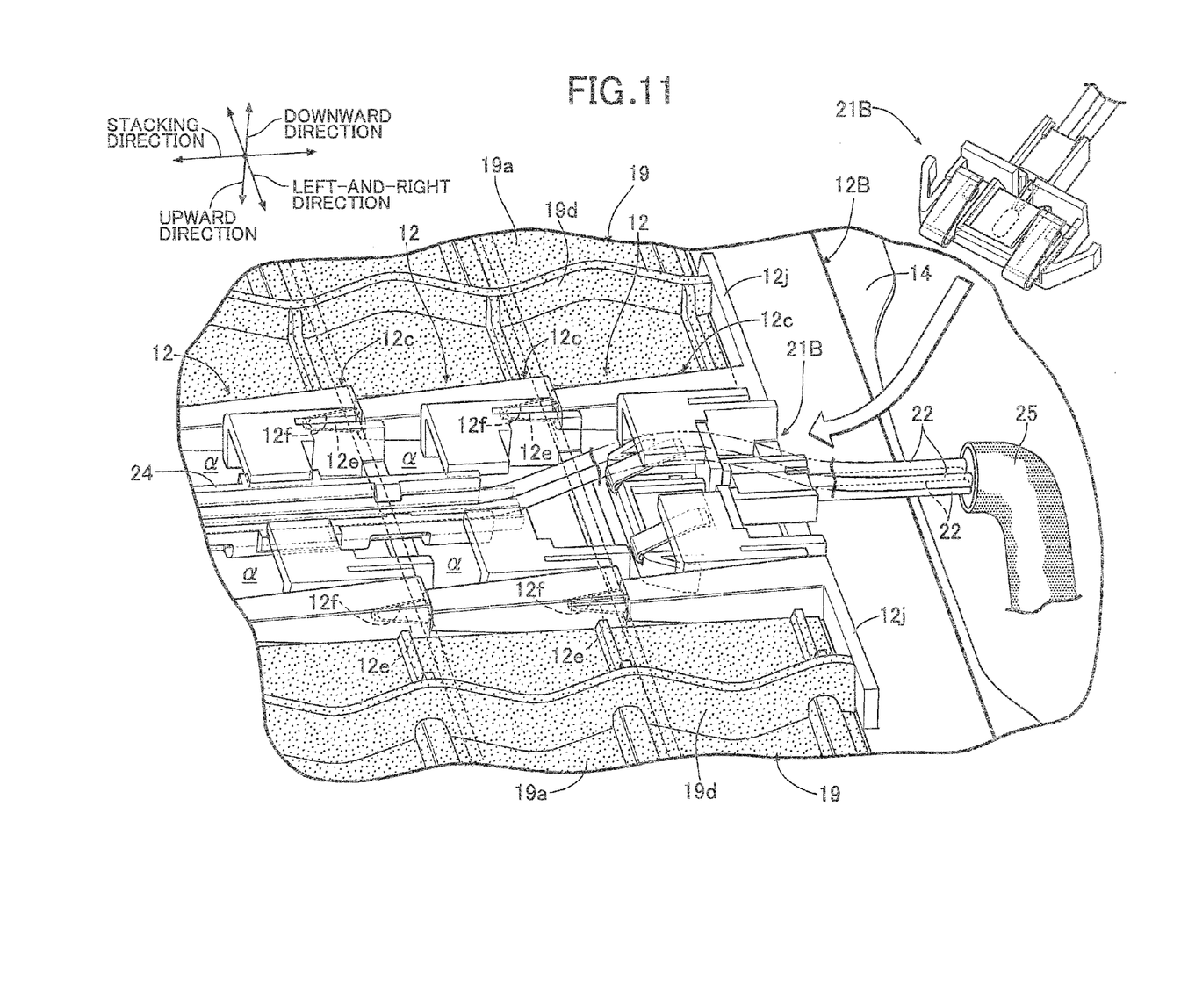
FIG. 11 is a view in the direction of arrow 11 in FIG. 5. (first embodiment)

As shown in FIG. 2, FIG. 10, and FIG. 11, the thermistor retaining portions 12c of the intermediate power storage cell holders 12 and the other end power storage cell holder 12B are linked to each other due to engagement between pins 12e and pin holes 12f, a thermistor 21A is fitted into the thermistor retaining portion 12c of the intermediate power storage cell holder 12 positioned at one end in the stacking direction, the thermistor 21A measuring temperature by being in contact with the bottom face 11d of the power storage cell 11 positioned at said one end in the stacking direction, and a thermistor 21B is fitted into the thermistor retaining portion 12c of the end power storage cell holder 12B positioned at the other end in the stacking direction, the thermistor 21B measuring temperature by being in contact with the bottom face 11d of the power storage cell 11 positioned at said other end in the stacking direction.

Harnesses 22 and 22 extending from the thermistor 21A are retained in the interior of a harness holder 24 formed into a sheath shape from a synthetic resin. The harnesses 22 and 22 of the thermistor 21A extending from the other end side in the stacking direction of the harness holder 24 are superimposed on the other thermistor 21B, a total of four harnesses 22 of the thermistors 21A and 21B being hound there and covered by a harness cover 25. A connector 26 provided at tips of the four harnesses 22 coining out from the harness cover 25 is connected to an electronic control unit 27 (see FIG. 5) provided on the other end plate 14.

Figure 4:
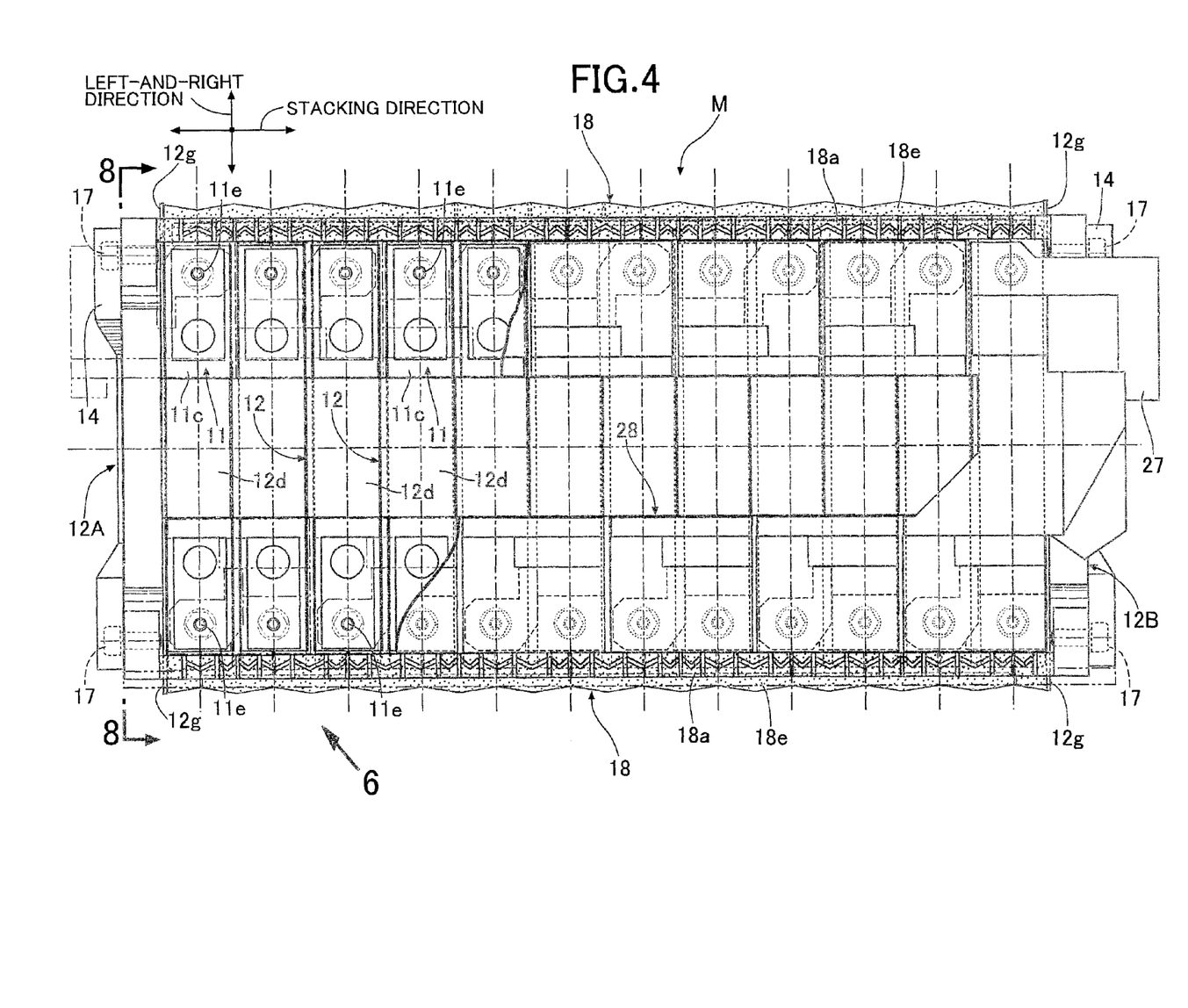
FIG. 4 is a view in the direction of arrow 4 in FIG. 1. (first embodiment)

As shown in FIG. 1 and FIG. 4, among the top faces 11c of the twelve power storage cells 11, the intermediate part in the left-and-right direction is covered by the shielding portions 12d of the intermediate power storage cell holders 12 and the end power storage cell holder 12A, and opposite end parts in the left-and-right direction, from which the electrodes 11e project, are covered by a bus bar plate 28 formed into a U-shape from an insulating material. The bus bar plate 28 has a metal plate that electrically connects in series the electrodes 11e of the twelve power storage cells 11.

Figure 3:
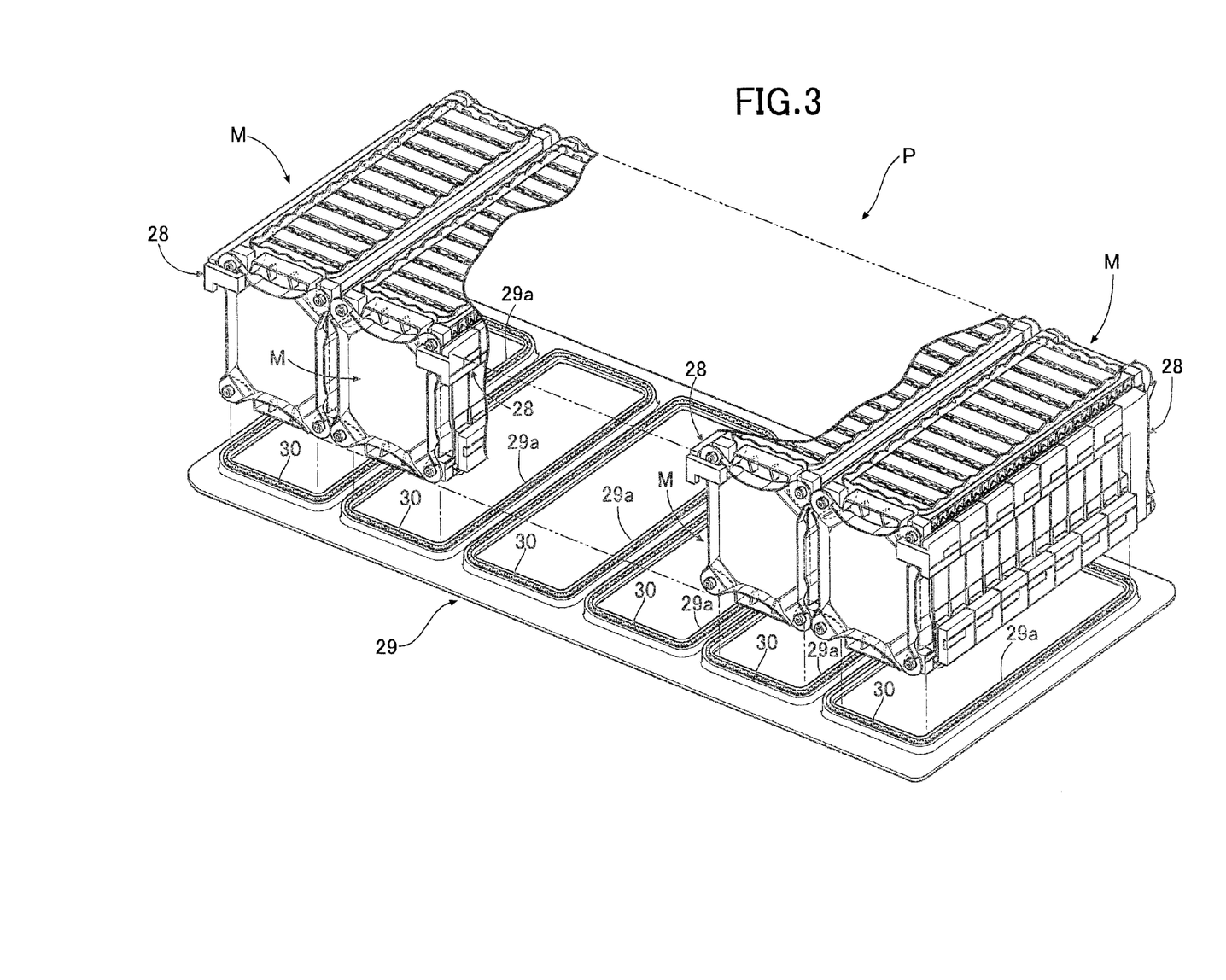
FIG. 3 is a perspective view of a power storage pack. (first embodiment)

As shown in FIG. 3, six of the power storage modules M are supported on one support plate 29, made of metal, to thus form a power storage pack P. In this arrangement, the power storage modules M are arranged in an attitude in which they are tilted through 90° so that the left-and-right direction becomes the vertical direction, and upper faces thereof on which the bus bar plates 28 are provided face opposite directions in turn. Six rectangular openings 29a are formed in the support plate 29 so as to oppose one of left and right side faces of the six power storage modules M, and an annular seal member 30 formed from an elastic member such as a foam rubber is disposed on the periphery of each opening 29a. In a vehicle-mounted state as shown in FIG. 3, the left-and-right direction defined for FIG. 1 and FIG. 2 becomes the vertical direction, and the up-and-down direction defined for FIG. 1 and FIG. 2 becomes the horizontal direction.

As shown in FIG. 2, FIG. 4, and FIG. 6 to FIG. 8, the upper insulator 18 is a member molded as a unit from a synthetic resin, and its constant cross section in the stacking direction includes a first wall portion 18a, a second wall portion 18b, a third wall portion 18c, a fourth wall portion 18d, and a fifth wall portion 18e (see FIG. 7); a vertical wall 15b, which is vertical in a vehicle-mounted state, of the upper frame 15 having an L-shaped cross section is covered by the first wall portion 18a, the second wall portion 18b, and the third wall portion 18c, and an upper face of a horizontal wall 15c, which is horizontal in the vehicle-mounted state, of the upper frame 15 is covered by the fourth wall portion 18d. The extremity of the fifth wall portion 18e, which extends downwardly from the fourth wall portion 18d in the vertical direction in the vehicle-mounted state, bends in a zig-zag manner.

Furthermore, a large number of first ribs 18f, which extend vertically in the vehicle-mounted state, are formed in parallel on an outer face, which extends substantially flush with the top faces 11c of the power storage cells 11, of the first wall portion 18a, and a plurality of second ribs 18g providing a connection between two adjacent first ribs 18f and 18f are formed into a V-shape on the outer face. The second ribs 18g of the upper insulator 18 positioned on the upper side in the vertical direction in the vehicle-mounted state are disposed in an inverted V-shape, but the second ribs 18g of the upper insulator 18 positioned on the lower side in the vertical direction in the vehicle-mounted state are disposed in a V-shape (see FIG. 4).

Figure 7:
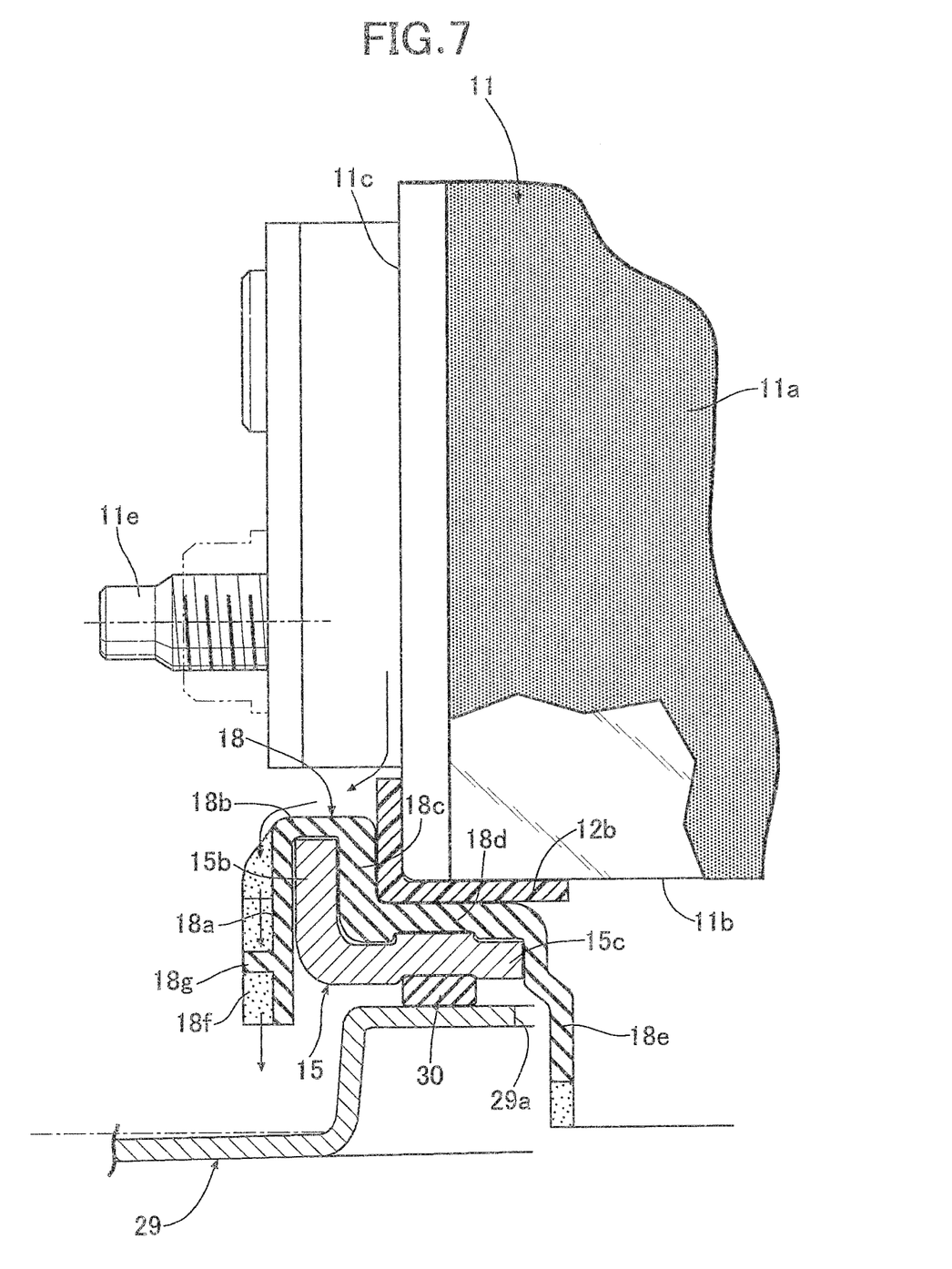
FIG. 7 is a sectional view along line 7-7 in FIG. 6. (first embodiment)

Furthermore, a lower face of the horizontal wall 15c of the upper frame 15 positioned on the lower side in the vertical direction in the vehicle-mounted state and the lower end, in the vertical direction, of the first wall portion 18a of the upper insulator 18 positioned on the lower side in the vertical direction in the vehicle-mounted state oppose an upper face of the support plate 29, and the lower end, in the vertical direction, of the fifth wall portion 18e of the upper insulator 18 positioned on the lower side in the vertical direction in the vehicle-mounted state extends downwardly beyond the edge of the opening 29a of the support plate 29. In this arrangement, the seal member 30 is held between the lower face of the horizontal wall 15c of the upper frame 15 and the edge of the opening 29a of the support plate 29 (see FIG. 7). As shown in FIG. 7, the lower end of the first wall portion 18a is positioned on the lower side in the vertical direction relative to the lower face of the horizontal wall 15c of the upper frame 15.

As shown in FIG. 2, FIG. 5, FIG. 6, and FIG. 8, the lower insulator 19 includes a first wall portion 19a extending along the bottom faces 11d of the power storage cells 11, a second wall portion 19b rising from the first wall portion 19a and extending along the side faces 11b of the power storage cells 11, and a third wall portion 19c rising from the second wall portion 19b and extending in a direction away from the side faces 11b of the power storage cells 11, the extremity of the third wall portion 19c bending in a zig-zag manner.

The third wall portion 19c of the lower insulator 19 and the fifth wall portion 18e of the upper insulator 18 have an identical shape (see FIG. 6) and are positioned in parallel to each other with a predetermined gap along the stacking direction. Therefore, in the same way as for the fifth wall portion 18e of the upper insulator 18, in the vehicle-mounted state the lower end, in the vertical direction, of the third wall portion 19e of the lower insulator 19 extends downwardly beyond the edge of the opening 29a of the support plate 29, and the seal member 30 is held between a lower face of the horizontal wall 16c of the lower frame 16 (see FIG. 8) and the edge of the opening 29a of the support plate 29.

First wall portions 12g and 12g project from left and right end parts of the end power storage cell holders 12A and 12B, and extremities of the first wall portions 12g and 12g bend in a zig-zag manner. The fifth wall portion 18e of the upper insulator 18, the third wall portion 19c of the lower insulator 19, and the first wall portions 12g and 12g of the end power storage cell holders 12A and 12B are connected to each other to thus form a rectangular frame (see FIG. 6), and in the vehicle-mounted state the lower end, in the vertical direction, of the rectangular frame extends downwardly beyond lower ends, in the vertical direction, of the power storage cells 11 and the end plates 14 and 14 and beyond the edge of the opening 29a of the support plate 29.

Figure 5:
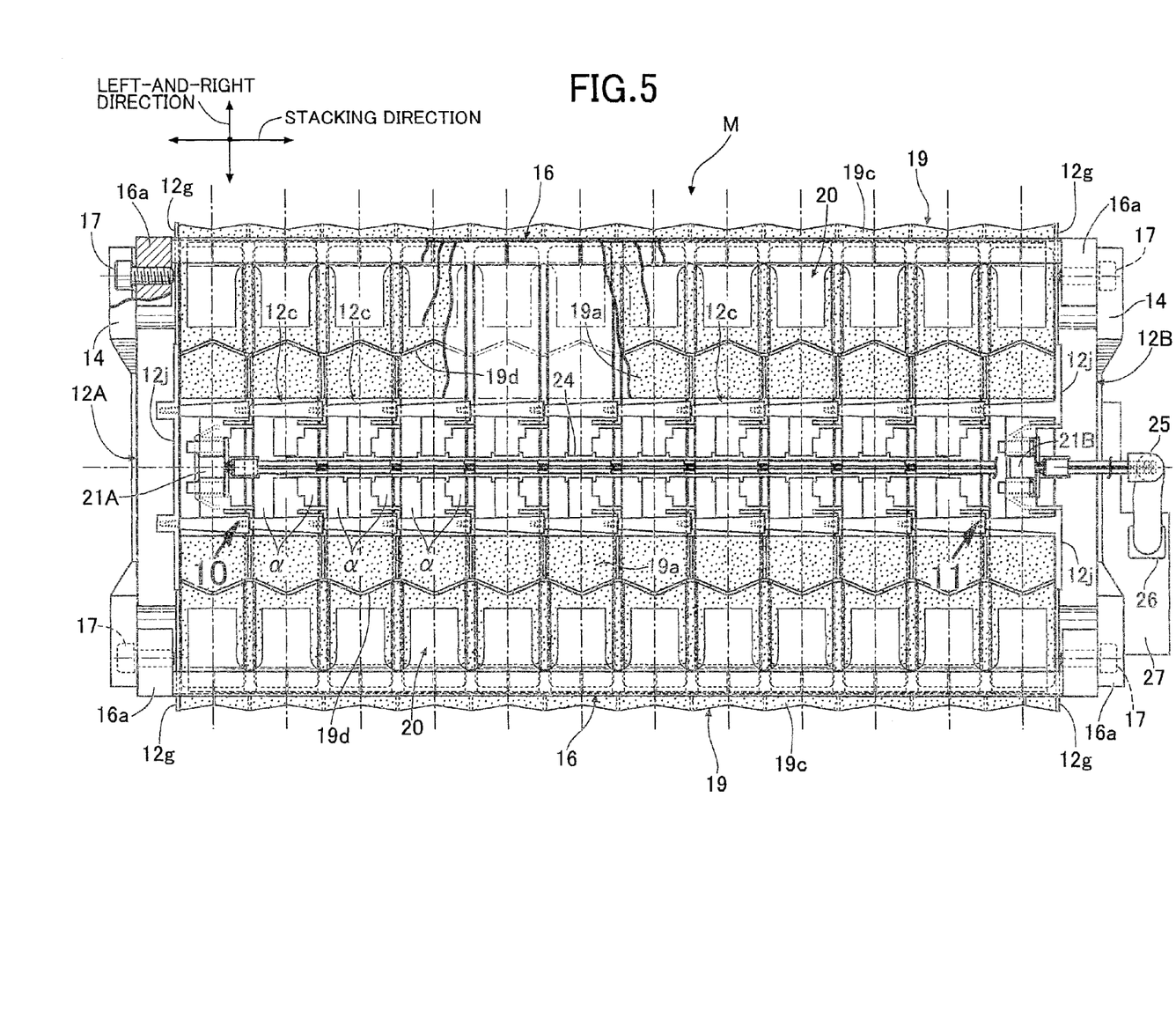
FIG. 5 is a view in the direction of arrow 5 in FIG. 1. (first embodiment)

As shown in FIG. 5, FIG. 10, and FIG. 11, opposite end parts in the left-and-right direction of the bottom faces 11d of the power storage cells 11 forming the power storage module M are completely covered by the first wall portions 19a and 19a of the pair of the lower insulators 19 and 19, and a section sandwiched by the pair of first wall portions 19a and 19a is partially covered by the thermistor retaining portions 12c of the intermediate power storage cell holders 12 and the end power storage cell holder 12B on said other end side. A first partition wall 19d bending in a zig-zag manner in the left-and-right direction and extending in the stacking direction is projectingly provided on a lower face of the first wall portion 19a. In the vehicle-mounted state in which the bottom faces 11d of the power storage cells 11 face the vertical direction (see FIG. 5), the first partition wall 19d, which bends in a zig-zag manner, attains a shape in which a large number of V shapes are connected.

As shown in FIG. 5, FIG. 10, and FIG. 11, second partition walls 12j and 12j project downwardly from lower ends of the pair of end power storage cell holders 12A and 12B. The second partition walls 12j and 12j of the end power storage cell holders 12A and 12B form a rectangular frame in cooperation with the first partition walls 19d and 19d of the pair of the lower insulators 19 and 19, and this frame surrounds the periphery of the thermistor retaining portions 12c of the intermediate power storage cell holders 12 and the end power storage cell holder 12B on said other end side.

Figure 8:
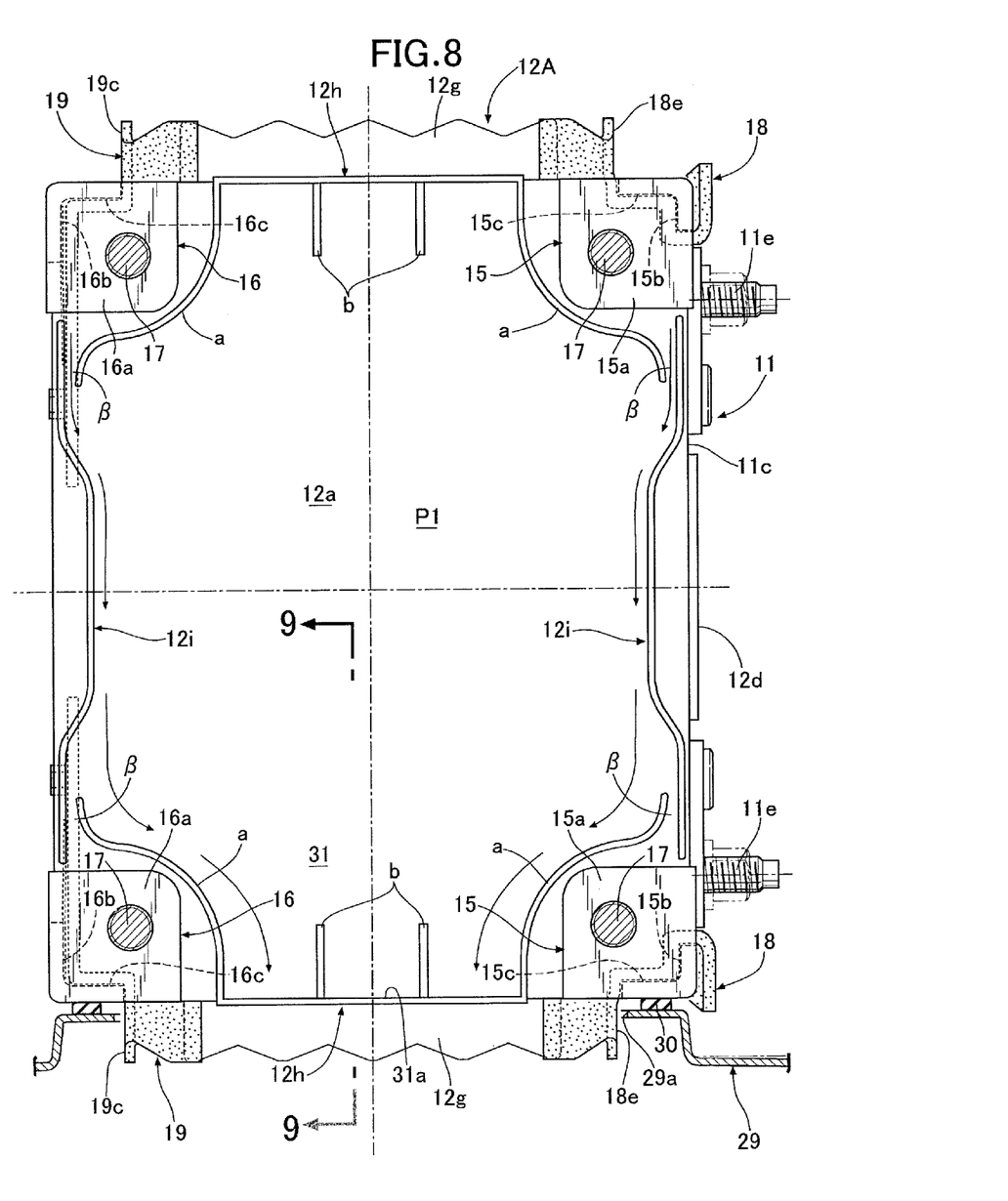
FIG. 8 is a view from arrowed line 8-8 in FIG. 4. (first embodiment)
Figure 9:
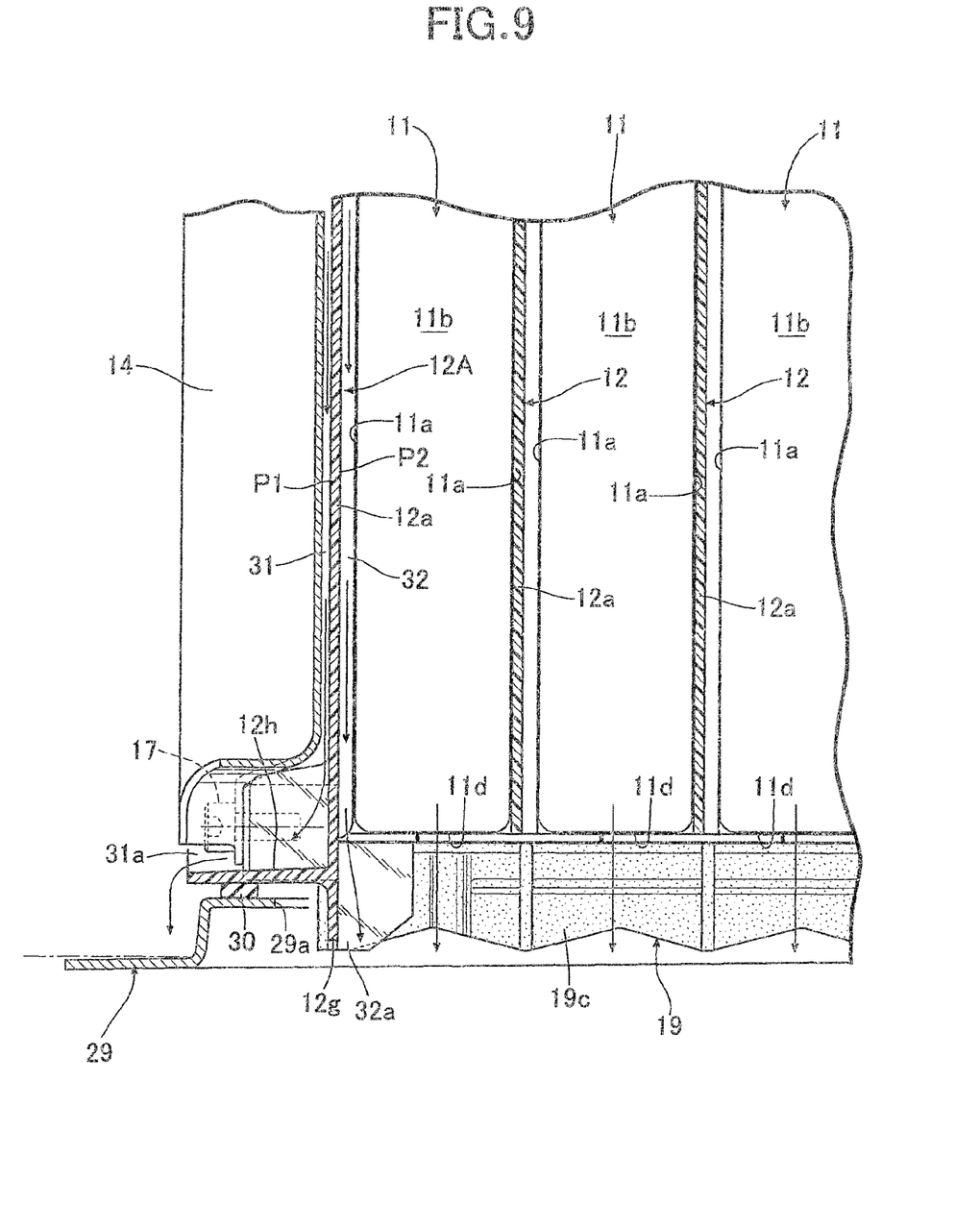
FIG. 9 is a sectional view along line 9-9 in FIG. 8. (first embodiment)

As shown in FIG. 8 and FIG. 9, the end power storage cell holder 12A on said one side includes a pair of first guide ribs 12h and 12h and a pair of second guide ribs 12i and 12i surrounding the plate portion 12a. The pair of first guide ribs 12h and 12h extend along the pair of side faces 11b and 11b of the power storage cells 11, separating parts a at opposite ends thereof curving into an arc-shape curve so as to move away from the fastening portions 15a 15a, 16a, 16a of the upper frames 15 and 15 and the lower frames 16 and 16. The pair of second guide ribs 12i and 12i extend along the top face 11c and the bottom face 11d of the power storage cells 11, and opposite ends thereof are superimposed on opposite ends of the pair of first guide ribs 12h and 12h via a cutout β. Two guide parts b extend from part of each of the pair of first guide ribs 12h and 12h extending along the pair of side faces 11b and 11b of the power storage cells 11, the guide parts b extending in directions in which they approach each other.

A first drainage channel 31 is formed on a first face P1, on the end plate 14 side, of the end power storage cell holder 12A (see FIG. 9). In the vehicle-mounted state, the first drainage channel 31 extends downwardly in the vertical direction along the plate portion 12a of the end power storage cell holder 12A, and the lower end thereof is bent through 90° in a substantially horizontal direction by means of the first guide rib 12h. In this arrangement, the first guide rib 12h is inclined with respect to the horizontal direction so that the extremity side is slightly lower. On the other hand, a second drainage channel 32 is formed on a second face P2, on the power storage cells 11 side, of the end power storage cell holder 12A (see FIG. 9). In the vehicle-mounted state, the second drainage channel 32 extends downwardly in the vertical direction along the plate portion 12a of the end power storage cell holder 12A.

The edge of the opening 29a of the support plate 29 is positioned between an outlet 31a of the first drainage channel 31 and an outlet 32a of the second drainage channel 32, and the edge is set so as to be at a height that is lower than the height of the outlet 31a of the first drainage channel 31 and higher than the height of the outlet 32a of the second drainage channel 32. Furthermore, the support plate 29 is inclined so that the first drainage channel 31 side is slightly lower than the second drainage channel 32 side. The seal member 30 is disposed between the edge of the opening 29a of the support plate 29 and the lower face of the first guide rib 12h. The seal member 30 is originally for preventing the leakage of cooling air for cooling the power storage cells 11, but in the present embodiment it exhibits a function of preventing the leakage of condensed water in addition to the above function.

The structure of the end power storage cell holder 12A on one side is explained above, but the structure of the end power storage cell holder 12B on the other side is substantially the same.

The operation of the embodiment of the present invention having the above arrangement is now explained.

Among the surfaces of the power storage cells 11 forming the power storage module M, the main faces 11a and 11a and the side faces 11b and 11b are covered by the condensation-preventing sheet and it is therefore relatively difficult for condensed water to form thereon, but the top face 11c and the bottom face 11d are not covered by the condensation-preventing sheet, and it is therefore relatively easy for condensed water to form. When galvanic water whose potential has been increased by contacting the electrodes 11e of the power storage cells 11 forms a liquid junction with the upper frames 15 and 15 or the lower frames 16 and 16, there is a possibility that current will flow from the upper frames 15 and 15 or the lower frames 16 and 16 to the vehicle body via the end plates 14 and 14, and it is therefore necessary to suppress the formation of a liquid junction between the power storage cells 11 and the upper frames 15 and 15 and lower frames 16 and 16 or between the power storage cells 11 and the end plates 14 and 14.

Since the intermediate power storage cell holders 12, which are made of a synthetic resin, are disposed between adjacent power storage cells 11, the end power storage cell holders 12A and 12B, which are made of a synthetic resin, are disposed between the power storage cells 11 and the end plates 14 and 14, the upper insulators 18 and 18, which are made of a synthetic resin, are disposed between the power storage cells 11 and the upper frames 15 and 15, and the lower insulators 19 and 19, which are made of a synthetic resin, are disposed between the power storage cells 11 and the lower frames 16 and 16, the formation of a liquid junction can be suppressed to some extent by means of these synthetic resin members, but it is necessary to take measures assuming a case in which a large quantity of condensed water formed.

Since the power storage module M is mounted on a vehicle in manner in which it is tilted through 90° such that one of the side faces 11b of the power storage cells 11 faces downward in the vertical direction, it is important to provide electrical shielding between, among the pair of upper frames 15 and 15 and the pair of the lower frames 16 and 16, the upper frame 15 and lower frame 16 that are on the lower side in the vehicle-mounted state and the upper insulator 18 and lower insulator 19e on the lower side in the vertical direction, which cover them.

Among the surfaces of each power storage cell 11, it is easy for condensed water to form on the top face 11c and the bottom face 11d, which are non-covered portions that are not covered by the condensation-preventing sheet, but since the top face 11c of the power storage cell 11 is covered by the shielding portion 12d of the intermediate power storage cell holder 12 or the end power storage cell holder 12B and the bus bar plate 28, a majority of the bottom face 11d of the power storage cell 11 is covered by the first wall portions 19a and 19a of the pair of the lower insulators 19 and 19, and the openings a of the thermistor retaining portions 12c of the intermediate power storage cell holders 12 into which the thermistors 21A and 21B are not fitted are only slightly open, by carrying out thermal insulation by covering the top face 11c and the bottom face 11d, on which condensed water easily forms, as much as possible, the formation of condensed water can be minimized and a liquid junction can be prevented from being formed (see FIG. 10 and FIG. 11).

Furthermore, if the peripheries of the power storage cells 11 are completed sealed, there is a possibility that a liquid junction will be formed between the power storage cells 11 themselves as a result of just a small amount of condensed water being formed, but due to part of the bottom wall 11d being exposed by means of the opening α of the thermistor retaining portion 12c, condensed water formed on the power storage cell 11 can be discharged to the outside via the opening α, thereby preventing a liquid junction from being formed between the power storage cells 11 due to condensed water.

Moreover, there is a possibility that a liquid junction will be formed if condensed water flowing out from the opening α makes the lower frame 16 beneath it in the vertical direction become wet, but since the first partition wall 19d projects, in a canopy shape, from the first wall portion 19a of the lower insulator 19 connected to the underneath of the opening α, it is possible to prevent the lower frame 16 from becoming wet due to the condensed water to thus form a liquid junction. Furthermore, since the pair of end power storage cell holders 12A and 12B include the second partition walls 12j and 12j, which surround the opening α in cooperation with the first partition walls 19d and 19d of the lower insulators 19 and 19, it is possible by means of the second partition walls 12j and 12j to reliably prevent condensed water that has flowed out from the opening α from forming liquid junction with the end plates 14 and 14 (see FIG. 10 and FIG. 11).

Figure 6:
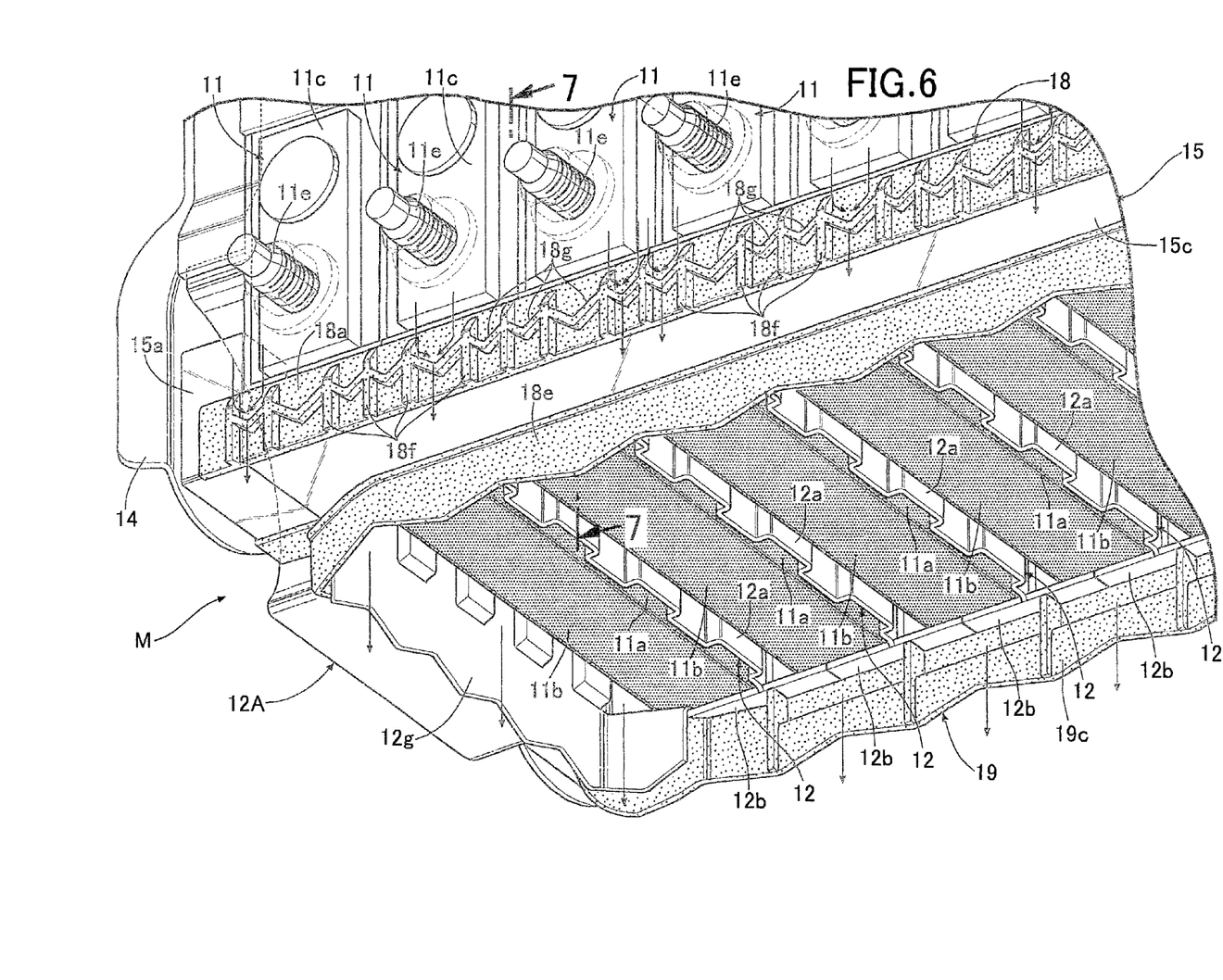
FIG. 6 is a view in the direction of arrow 6 in FIG. 4. (first embodiment)

When condensed water formed on the top faces 11c of the power storage cells 11 flows downwardly in the vertical direction and reaches the first wall portion 18a of the upper insulator 18, since the large number of first ribs 18f, which extend vertically, are formed on the surface of the first wall portion 18a, condensed water is guided downwardly by the first ribs 18f and prevented from flowing toward the end plates 14 and 14 side along the upper insulator 18, thereby preventing a liquid junction from being formed between the power storage cells 11 and the end plates 14 and 14 via the upper insulator 18 (see FIG. 6).

Condensed water guided downwardly by means of the first ribs 18f is temporarily retained by the V-shaped second ribs 18g, and condensed water temporarily builds up between the first ribs 18f and the second ribs 18g; after a fixed amount of condensed water has built up it drops downward, thus making it difficult to form uninterrupted condensed water, electrical contact between the power storage cells 11 and a component made of metal that is present in the vicinity thereof (for example, the support plate 29) via uninterrupted condensed water is prevented, and as a result the formation of a liquid junction can be prevented. Moreover, since condensed water formed on the power storage cells 11 flows downwardly along the upper insulator 18, it is also possible to prevent effectively a liquid junction from being formed between the power storage cells 11 due to the condensed water.

Furthermore, the fifth wall portion 18e of the upper insulator 18, the third wall portion 19c of the lower insulator 19, and the pair of first wall portions 12g and 12g of the pair of end power storage cell holders 12A and 12B are disposed as a rectangular frame-shaped wall inside the space bounded by the upper frame 15, the lower frame 16, and the pair of end plates 14 and 14. Since the lower end of the wall extends further downwardly in the vertical direction than the lower ends of the upper frame 15, the lower frame 16, and the pair of end plates 14 and 14, it is possible to prevent effectively condensed water flowing downwardly from the power storage cells 11 from contacting the upper frame 15, the lower frame 16, and the pair of end plates 14 and 14 (see FIG. 6).

Moreover, since the lower edges of the fifth wall portion 18e of the upper insulator 18, the third wall portion 19c of the lower insulator 19, and the pair of first wall portions 12g and 12g of the pair of end power storage cell holders 12A and 12B bend in a zig-zag shape, it is possible to make the drainage of condensed water good, thereby preventing further effectively a liquid junction from being formed between the power storage cells 11 and the upper frame 15, lower frame 16, and end plates 14 and 14.

Furthermore, the power storage module M is supported on the opening 29a of the support plate 29, and since the lower edges of the fifth wall portion 18e of the upper insulator 18, the third wall portion 19c of the lower insulator 19, and the pair of first wall portions 12g and 12g of the pair of end power storage cell holders 12A and 12B extend through the opening 29a of the support plate 29 downwardly in the vertical direction, it is possible to prevent condensed water from contacting the support plate 29, thereby preventing the formation of a liquid junction via the support plate 29 (see FIG. 8).

Furthermore, condensed water formed on the surface of the end plate 14 becomes attached to the first discharge path 31 along the first face P1, opposing the end plate 14, of the end power storage cell holder 12A, and condensed water formed on the surface of the power storage cells 11 becomes attached to the second discharge path 32 along the second face P2, opposing the power storage cells 11, of the end power storage cell holder 12A. The former condensed water is non-galvanic water, whereas the latter condensed water is galvanic water; if the two are mixed, the entirety becomes galvanic water, and a liquid junction easily forms, therefore making it necessary to block the mixing thereof.

The first drainage channel 31 formed on the first face P1 of the end power storage cell holder 12A extends downwardly in the vertical direction and then bends outwardly in the stacking direction, whereas the second drainage passage 32 formed on the second face P2 of the end power storage cell holder 12A extends downwardly in the vertical direction in a straight manner, and it is therefore possible to separately discharge the non-galvanic water of the first drainage channel 31 and the galvanic water of the second drainage passage 32 so that they do not contact each other, thereby preventing a liquid junction from being formed between the power storage cells 11 and the end plate 14 (see FIG. 9).

Furthermore, since the first and second guide ribs 12h, 12h, 12i, 12i projecting outwardly in the stacking direction are formed on the periphery of the first face P1, and the first drainage channel 31 is connected to the inside thereof, it is possible to reliably discharge non-galvanic water on the first face P1 to the first drainage channel 31, thereby preventing the non-galvanic water from leaking from the first face P1 side to the second face P2 side and contacting the galvanic water. In this arrangement, since the part of the first drainage channel 31 that bends outwardly in the stacking direction is inclined so that the downstream side is low, it is possible to smoothly discharge the non-galvanic water of the first drainage channel 31, thereby preventing it from contacting the galvanic water of the second drainage channel 32 (see FIG. 8 and FIG. 9).

Moreover, since the first and second guide ribs 12h and 12h, 12i, 12i of the end power storage cell holder 12A include the separating parts a surrounding the fastening portions 15a, 15a, 16a, 16a of the upper frames 15 and 15 and the lower frames 16 and 16 for connecting the pair of end plates 14 and 14 with each other, it is possible to smoothly discharge condensed water formed on the surfaces of the upper frames 15 and 15 and the lower frames 16 and 16 to the first drainage channel 31, through which non-galvanic water flows, thus preventing it from flowing into the second drainage channel 32, through which galvanic water flows, and preventing the formation of a liquid junction between the upper frames 15 and 15 and lower frames 16 and 16 and the end plates 14 and 14.

Furthermore, since the edge of the opening 29a of the support plate 29 is positioned between the outlet 31a of the first drainage channel 31 and the outlet 32a of the second drainage channel 32, and the edge is at a height that is lower than the height of the outlet 31a of the first drainage channel 31 and higher than the height of the outlet 32a of the second drainage channel 32, it becomes difficult for galvanic water discharged from the outlet 32a of the second drainage channel 32 to flow beyond the edge of the opening 29a of the support plate 29 and contact non-galvanic water discharged from the outlet 31a of the first drainage channel 31, thereby reliably preventing a liquid junction from being formed due to contact between the galvanic water and the non-galvanic water (see FIG. 9).

Moreover, since the seal member 30 is disposed between the edge of the opening 29a of the support plate 29 and the end power storage cell holder 12A, it is possible to more reliably prevent contact between the non-galvanic water on the first drainage channel 31 side and the galvanic water on the second drainage channel 32 side. Furthermore, since the support plate 29 is tilted so that the first drainage channel 31 side is lower than the second drainage channel 32 side, it is possible to prevent condensed water that has dropped from the first drainage channel 31 on the support plate 29 from flowing back toward the second drainage channel 32 side, thus preventing the formation of a liquid junction.

The operation of the end power storage cell holder 12A on one side is explained above, but the operation of the end power storage cell holder 12B on the other side is the same.

An embodiment of the present invention is explained above, but the present invention may be modified in a variety of ways as long as the modifications do not depart from the spirit and scope thereof.

For example, the power storage cell 11 of the embodiment is not limited to a lithium ion battery and may be another type of battery or capacitor.

Furthermore, the shapes of the upper insulator 18, the lower insulator 19, the intermediate power storage cell holder 12, the end power storage cell holders 12A and 12B, and the bus bar plate 28, etc., which cover the power storage cell 11, are not limited to those of the embodiment.

Moreover, in the embodiment condensed water is explained, but needless to say the present invention is also effective with respect to electrolyte that has leaked from the power storage cell 11 or water that has entered from the outside.

The invention claimed is:

1. A power storage module comprising a plurality of power storage cells and a plurality of power storage cell holders which the power storage cells and the power storage cell holders are stacked alternately in a stacking direction, a pair of end plates that are superimposed at opposite ends in the stacking direction of the power storage cells and the power storage cell holders, a frame that connects the pair of end plates, an insulator that has an insulating property and covers the frame, and an insulating bus bar plate that has a metal plate electrically connecting the plurality of power storage cells to each other,     wherein the power storage cell is covered by a condensation-preventing sheet other than a non-covered portion that corresponds to opposite surface portions which are not covered by the condensation-preventing sheet, and the non-covered portion at one of the opposite surface portions is covered by the power storage cell holder, the insulator, and the bus bar plate,     wherein the bus bar plate covers electrodes of the power storage cells, wherein the insulator comprises a plurality of first ribs that extend vertically in a vehicle-mounted state, each of the plurality of first ribs being disposed in parallel on an outer face of the insulator, and wherein the insulator further comprises a plurality of second ribs, each of the plurality of second ribs being connected between two adjacent first ribs.

2. The power storage module according to claim 1, wherein the plurality of power storage cell holders comprise a thermistor retaining portion that retains a thermistor for measuring a temperature of the power storage cell, the thermistor retaining portion is disposed at a position of the power storage cell holder where the power storage cell holder covers the non-covered portion of the other of the opposite surface portions of the power storage cell, the number of thermistors is smaller than the number of power storage cell holders, and an opening is formed in those of the thermistor retaining portions into which the thermistor is not fitted, the opening communicating with the non-covered portion.

3. The power storage module according to claim 2, wherein the insulator comprises a first partition wall extending along the stacking direction so as to be positioned between the opening and the frame.

4. The power storage module according to claim 3, wherein among the plurality of power storage cell holders, a pair of the power storage cell holders that are adjacent to the pair of end plates comprise a second partition wall surrounding the opening in cooperation with the first partition wall.

* * * * *